United States Patent Office 3,483,713
Patented Dec. 16, 1969

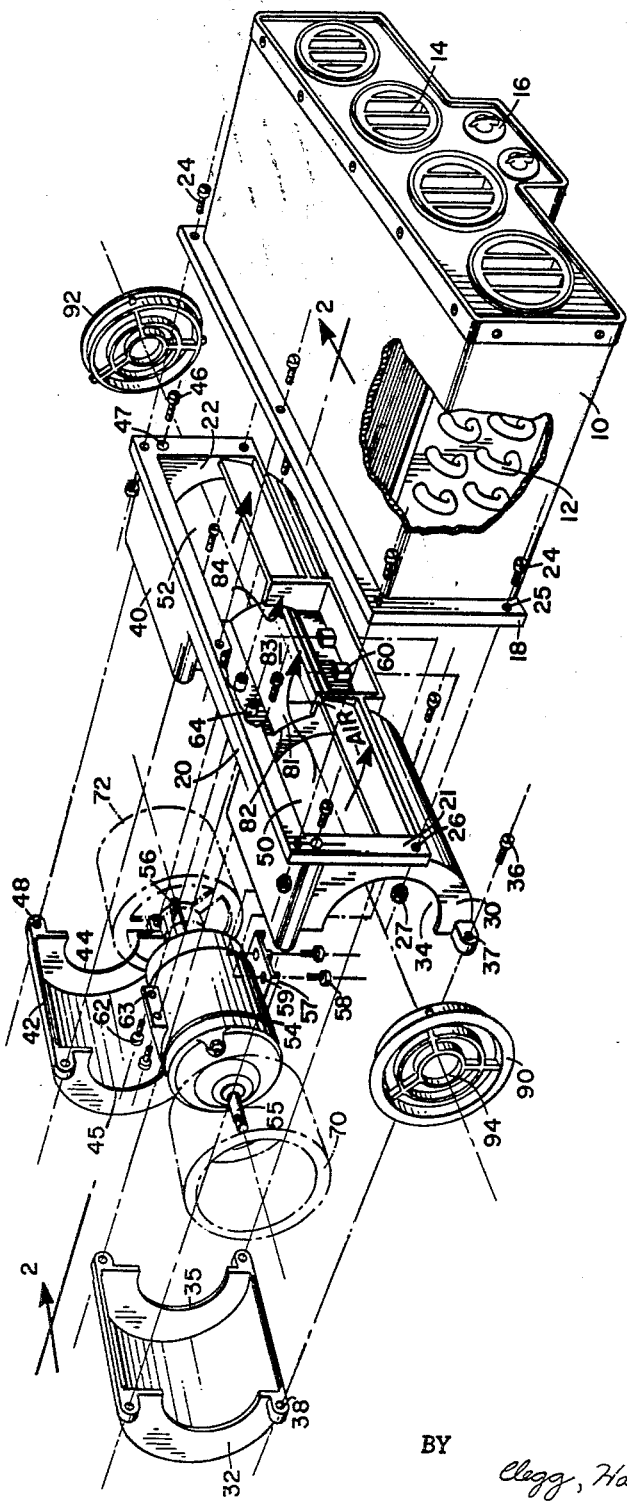

3,483,713
AIR BLOWER APPARATUS
Albert B. Cole, Jr., 1024 N. Alamo, San Antonio, Tex. 78215, and Donald I. Dennis, P.O. Box 418, Jacksonville, Tex. 75766
Filed Jan. 26, 1968, Ser. No. 700,773
Int. Cl. F25d 17/06; B60h 3/04
U.S. Cl. 62—426                    5 Claims

ABSTRACT OF THE DISCLOSURE

An air blower apparatus for under-the-dash automobile air-conditioners comprises a main body for being attached at the front face thereof to the rear side of the air conditioner refrigeration coils unit, blower housing means opening directly into the air discharge opening for forcing air across the refrigeration coils, and a plenum chamber formed between the air-conditioner coils and the apparatus that comprises a wall of the main body unit spaced rearward from the air discharge opening that communicates with the blower housings, so that air is forced across substantially the entire width of the refrigeration coils.

---

Blower units that employ a pair of spaced apart squirrel-cage type blowers are commonly used in conjunction with automobile air conditioning apparatus, and especially air-conditioning apparatus for automobiles in which the refrigeration coils, or cooling coils, are located in separate unit attached to the underside of the instrument panel within the interior of the automobile. These blower units are usually the same width as the air conditioner coils unit and are mounted at the air discharge face thereof to the rear side of the air-conditioner refrigeration coils unit. The pair of blowers are spaced apart and situated within blower housings and are supported and driven from shafts of a motor that is mounted between the two blowers. The effect of this arrangement is to cause air to be forced across laterally spaced apart sections of the refrigeration coils but in which there is allowed to exist a dead air space in the center section of the refrigeration coils intermediate at the ends thereof. In other words, the two spaced apart blowers cause air to be forced across spaced apart sections of the refrigeration coils, but essentially no air is forced across the center section of the coils.

Under operating conditions as described above, the refrigeration coils tend to freeze up in the center section thereof as a result of the death air space allowed to exist. More specifically, the refrigeration coils are designed to function properly when a flow of air is forced across the coils so that heat is removed from the air and added to the refrigerant within the coils, thus cooling the air for refrigeration purposes. When sufficient heat is not added to the refrigerant within the coils, such as the case where no heat is being added in the center section of the coils because of the lack of air flowing there across, the refrigerant freezes within the center section of the coils and stops the flow of refrigerant entirely. Thus the refrigeration unit becomes inoperative until the refrigerant is allowed to warm up and thus permit circulation to start again. Attempts to operate an automobile air-conditioner under these conditions also reduces the cooling efficiency of the air-conditioner, whereas additional air should be refrigerated and passed over the center section of the coils to increase the efficiency.

The invention as described hereinafter provides an air blower apparatus for an automobile air-conditioner in which air is directed across the entire of the width of the coils to prevent freezing of liquids in the coils and further increase the efficiency of refrigeration. Accordingly, there is provided an air blower apparatus or housing that is attached at the front face thereof to the rear side of an air-conditioner refrigeration coils unit and which defines an air discharge opening in the front face thereof that extends across substantially the full width of the refrigeration coils within the unit. A pair of spaced apart blower housings form rearward extensions of the apparatus directly behind the air discharge opening and communicate with this opening for forcing air through the opening into the coils. The apparatus further includes a surface or wall intermediate the ends of the air discharge opening that is spaced rearward from the air discharge opening against the back of which a motor can be mounted by any suitable means for driving the pair of spaced blowers. The pair of spaced blowers are attached to opposite shafts, respectively, of the motor for being supported and driven thereby. The surface or wall that is spaced rearward from the air discharge opening forms a plenum, or chamber of positive pressure air, in conjunction with the refrigeration coils when the apparatus is attached thereto which chamber communicates with the discharge openings of the air blower housings and actually provides an air conduit between the blower housing openings. More specifically, this rearwardly spaced surface intermediate the air blowers forms a chamber in conjunction with the refrigeration coil when the air blower apparatus is attached thereto, so that a positive pressure volume of air is always present at the central section of the air discharge opening, which causes air to be forced across the entire width of the refrigeration coils.

Other objects, features, and advantages will become readily apparent from the following detailed description of the invention when taken in conjunction with the appended claims and the sole figure of the drawing, which the sole figure is an exploded, perspective view of the air blower apparatus and the automobile refrigeration coils unit to which it is to be attached.

Referring to the sole figure of the drawing, there is shown, in a perspective and partially broken away view, an automobile refrigeration coils unit 10 that is primarily designed to be attached to the underside of the instrument panel of an automobile. The unit contains refrigeration coils 12, shown in the broken away section, that are connected to the compressor and condenser coils (not shown) constituting a part of the entire refrigeration system. Refrigerant is forced through the refrigeration coils 12 from the compressor, air is forced across the refigeration coils to give up heat to the refrigerant and to cool the air, the latter of which is discharged through front openings 14, and the refrigerant is returned to the condenser coil to be condensed and thereafter compressed all as is well known. The refrigerant coils unit also includes suitable controls 16 along the front panel thereof. In addition, the refrigeration unit is also provided with a suitable peripheral flange or surface 18 about the rear face thereof to which can be attached a suitable air blower apparatus.

An air blower apparatus according to the invention is shown exploded away from the rear face of the air-conditioning refrigeration coils unit and comprises a main body 20 that includes a peripheral flange or surface 21 in the plane of the front face there of that coincides with flange 18 of the refrigeration coils unit and which defines therein a front air discharge opening 22 that extends across substantially the entire width of the refrigeration coils 12. The blower apparatus is attached at the front face or flange 21 thereof to the rear face of flange 18 of the refrigeration unit by any suitable means, such as with bolts 24 extending through suitable openings 25 and 26 in the flanges of the refrigeration unit and the air blower apparatus, respectively, and secured to nuts 27.

A pair of spaced apart blower housings form rearward extensions of the main body behind the air discharge opening within which blowers, preferably of the squirrel-cage type, can be housed. In the embodiment shown, a first blower housing comprises a first substantially semi-cylindrical front portion 30 and a corresponding semi-cylindrical rear portion 32 for being attached to the front portion to provide a cylindrical housing within which the blower can be situated. When these two sections are secured together, there is defined a circular outside end opening 34 into which air is drawn by the blower to be forced across the coils, and a similar inside end opening 35 through which one shaft 55 of a motor 54 can extend for supporting and driving a first blower 70 (shown in phantom) located within the housing. The front and back semi-cylindrical sections of the blower housing are attached together by any suitable means, such as by bolts 36 passing through apertured flanges 37 on the front section and corresponding threaded, apertured flanges 38 on the rear section.

Another similar blower housing forms a rearward extension of the main body in laterally spaced relation from the first blower housing and comprises a first semi-cylindrical front section 40 and a second semi-cylindrical rear section 42 for being attached thereto, and as attached together, define an outside end opening 44 and an inside end opening 45 through the latter of which an opposing shaft 56 from motor 54 extends for supporting and driving another blower 72 (shown in phantom), preferably of the squirrel-cage type. The rear section of this blower housing is similarly connected or attached to the front section by any suitable means, such as by bolts 46 passing through apertures 47 and threaded into threaded, apertured flanges 48 on the rear section.

Openings 50 and 52 are provided in the front sections of the two blower housings that communicate directly with the laterally extending air discharge opening of the main body, so that air is forced directly out openings 50 and 52 across the refrigeration coils of the air-conditioner.

As already noted, a motor 54 is employed to drive the blowers by means of the opposing shafts 55 and 56 onto which the two blowers, respectively, are supported and driven. The main body 20 also includes a surface or wall section 81 intermediate the lateral ends thereof that is spaced rearward of the air discharge opening 22, so as to form a recess of chamber between this wall 81 and the rear of the refrigeration coils unit 10 when the air blower apparatus is attached to the coils unit. This chamber, which will be designated by numeral 83, communicates with openings 50 and 52 from the two blowers through the open ends 82 and 84 thereof and also communicates with the main air discharge opening 22. The function of this chamber will be described in more detail below.

The wall 81 and main body portion 20 also serve as means for mounting a motor 54 directly thereto. In the particular embodiment shown, this wall 81 is curved inward toward the front face of the apparatus to form a section of a cylindrical surface, so that the surface and curvature thereof corresponds to a motor to be mounted thereagainst. The motor can be attached by any suitable means to the back side of the air blower apparatus intermediate the two blower housings. For example, there is employed in the embodiment shown, a motor strap 57 encircling a portion of the circumference of the motor and which is attached at the lower end to the main body section 20 by means of screws or bolts 58 passing through apertures 59 in the strap and screwed into threaded receptacles 60 attached to or forming an integral part of the main body. Similarly, screws or bolts 62 passing through apertures 63 on a flange at the top side of the motor strap and threaded into threaded receptacles 64 in the top of the main body served to secure the motor to the back side of the air blower apparatus between the motor strap and the back side of wall or surface 81.

Air intake openings 34 and 44 in the two blower housings need not be provided with any additional fixture through which the air is taken into the blower units if the blowers themselves, when enclosed within the housings, extend laterally outward to a position substantially adjacent the inner surface of the circular openings. In the event that blowers or blades of reduced width are employed, so that a substantial space remains between the circular intake openings and the blower blades, a dead air space will undesirably be created at the intake to the blowers. Since the air blower apparatus can be manufactured separately from the motor and the blowers, blower fans of reduced width can often be employed. In order to eliminate any dead air space that would be created with the use of such blowers, venturi caps 90 and 92 are provided which comprise a series of concentric, annular rings or cylinders whose lengths along their axes are sufficient to extend to the immediate vicinity or adjacent the outside edge of the fan blades so that air taken in through the caps is fed directly into the blowers. These caps are simply urged into the openings and are held therein by pressure fit.

Referring again to chamber 83 located intermediate the lateral ends of the air discharge opening 22, this chamber is formed between the wall or surface 81 spaced rearward the air discharge opening and the back face of the air conditioning coils. This chamber, which will be referred to hereinafter as a plenum chamber, directly communicates and opens through the main air discharge openings 50 and 52 through the open sides 82 and 84 thereof between the wall 81 and the rear face of the air conditioning coil unit. Thus as air is blown across the coils from the two spaced apart blowers through openings 50 and 52 and main air discharge opening 22, air flows into the plenum chamber 83 and is directed out therefrom through the main discharge opening across the center section of the refrigeration coils. Plenum chamber 83 thus constitutes a volume of increased air pressure forcing air across the coils. It will then be apparent that a flow of air is directed out of the main air discharge opening 22 across the entire width thereof so that air is forced across the entire width of the refrigeration coils. This eliminates freeze up of any portion of the refrigeration coils, especially in the center thereof, which is normally the case when the plenum chamber is not provided.

The air blower apparatus can be constructed of any suitable materials and as of as many separate and different parts as desired. However, it is preferable to manufacture the main body section 20 from single plastic mold with the rear semi-cylindrical caps 32 and 42, and the motor strap 57 being provided separately. This allows ease of installation of the blowers and the motor.

Although the invention has been described with reference to a particular embodiment thereof, it is understood that certain modifications and substitutions that do not depart from the true scope of the invention are contemplated. Therefore, it is intended that the invention be limited only as defined in the appended claims.

What is claimed is:

1. Air blower apparatus for an automobile air-conditioner, comprising:
   (a) a main body having a front face for being attached at said front face to the rear side of an air-conditioner refrigeration coils unit,
   (b) said main body having an air discharge opening in said front face that extends across substantially the full width of the refrigeration coils within said unit,
   (c) a pair of spaced apart blower housings forming rearward extensions of said main body behind said air discharge opening for housing a pair of blowers, respectively, and which open into said air discharge opening for the discharge of air therethrough across said coils, and
   (d) said main body further having a surface spaced rearward of said air discharge opening intermediate the ends thereof which defines a plenum chamber in conjunction with said unit when said main body is attached to said unit and into opposite ends of said chamber said pair of blower housings, respectively, open and communicate so that air passes into said chamber and is forced out therefrom through the intermediate portion of said air discharge opening.

2. Air blower apparatus as set forth in claim 1 wherein said surface is curved inwardly toward said air discharge opening to correspond to a section of the surface of a motor to be mounted against said surface.

3. Air blower apparatus as set forth in claim 1 wherein said main body defines a space extending substantially the entire width there across that corresponds to the width of said refrigeration coils that comprises said plenum chamber and the spaces between the openings of said blower housings and said air discharge opening that communicates with said plenum chamber at opposite ends thereof.

4. Air blower apparatus as set forth in claim 1 wherein each of said pair of blower housings comprises a front, substantially semi-cylindrical section forming a rearward extension of said main body having semi-circular openings in the opposite ends thereof, a rear, substantially semi-cylindrical section for being attached to said front section having semi-circular openings in the opposite ends thereof to form a substantially cylindrical housing for said blower when attached together having circular openings in the ends thereof, and means for attaching together said front and said rear sections.

5. Air blower apparatus as set forth in claim 1 wherein said front face defines a flange along a length a portion of the perimeter thereof for attaching said apparatus to said air-conditioner refrigeration coils unit.

References Cited

UNITED STATES PATENTS

| 1,767,279 | 6/1930 | Bulkley | 62—426 |
| 2,008,255 | 7/1935 | Larkin | 62—426 |
| 2,122,140 | 6/1938 | Henney | 62—24 X |
| 3,138,085 | 6/1964 | Mitchell | 62—426 |

WILLIAM J. WYE, Primary Examiner

U.S. Cl. XR

165—121